United States Patent [19]
Weiss et al.

[11] Patent Number: 5,600,608
[45] Date of Patent: Feb. 4, 1997

[54] HYDROPHONE CARRIER

[75] Inventors: Franz Weiss, Chatswood; Robert D. Dowle, New South Wales, both of Australia

[73] Assignee: GEC Marconi Systems Pty, Ltd., Australia

[21] Appl. No.: 521,237

[22] Filed: Aug. 30, 1995

Related U.S. Application Data

[63] Continuation of Ser. No. 192,418, Feb. 4, 1994, abandoned.

[30] Foreign Application Priority Data

Apr. 6, 1993 [AU] Australia ................. PL8180

[51] Int. Cl.$^6$ ............................ G01V 1/00
[52] U.S. Cl. ........................ 367/20; 367/154
[58] Field of Search .............. 367/20, 154; 114/244, 114/253; 174/101.5

[56] References Cited

U.S. PATENT DOCUMENTS

| | | | |
|---|---|---|---|
| 3,371,311 | 2/1968 | Cholet et al. | 367/20 |
| 3,660,809 | 5/1972 | Pearson | 367/20 |
| 3,781,778 | 12/1973 | Sawin et al. | 367/20 |
| 3,939,464 | 2/1976 | Swenson | 367/20 |
| 3,961,304 | 6/1976 | Bakewell, Jr. | 367/20 |
| 3,970,878 | 7/1976 | Beralund | 367/20 |
| 4,296,481 | 10/1981 | Weiss | 367/20 |
| 4,300,218 | 11/1981 | Kruka et al. | 367/20 |
| 4,510,588 | 4/1985 | Kruka et al. | 367/20 |
| 4,536,862 | 8/1985 | Sullivan et al. | 367/20 |
| 4,638,469 | 1/1987 | Bryant et al. | 367/20 |
| 4,660,183 | 4/1987 | McGowen et al. | 367/20 |
| 4,679,178 | 7/1987 | Larsen et al. | 367/20 |
| 4,689,777 | 8/1987 | Roever | 367/20 |
| 4,809,243 | 2/1989 | Bledsoe et al. | 367/20 |
| 4,821,241 | 4/1989 | Beralund | 367/20 |
| 4,837,751 | 6/1989 | Kruke et al. | 367/20 |
| 4,920,523 | 4/1990 | Kruke et al. | 367/20 |
| 4,949,319 | 8/1990 | Boeglin et al. | 367/20 |
| 4,955,012 | 9/1990 | Bledsoe et al. | 367/20 |

FOREIGN PATENT DOCUMENTS

| | | |
|---|---|---|
| 0237616 | 9/1987 | European Pat. Off. . |
| 0508904 | 10/1992 | European Pat. Off. . |
| 0508587 | 10/1992 | European Pat. Off. . |
| 3809349 | 10/1989 | Germany . |

*Primary Examiner*—J. Woodrow Eldred
*Attorney, Agent, or Firm*—Welsh & Katz, Ltd.

[57] ABSTRACT

A hydrophone carrier for mounting a hydrophone in a streamer. The carrier consists of a pair of end plates spaced apart axially by at least one rigid or semi-rigid central member, thus defining a zone between the end plates which is isolated from structural stress and strain induced by streamer borne vibration, yet admitting externally induced pressure fluctuations such as result from acoustic waves present in the environment. The at least one rigid or semi-rigid central member may be arranged in a variety of configurations to allow the at least one streamer strength members and wires to pass through the carrier.

11 Claims, 3 Drawing Sheets

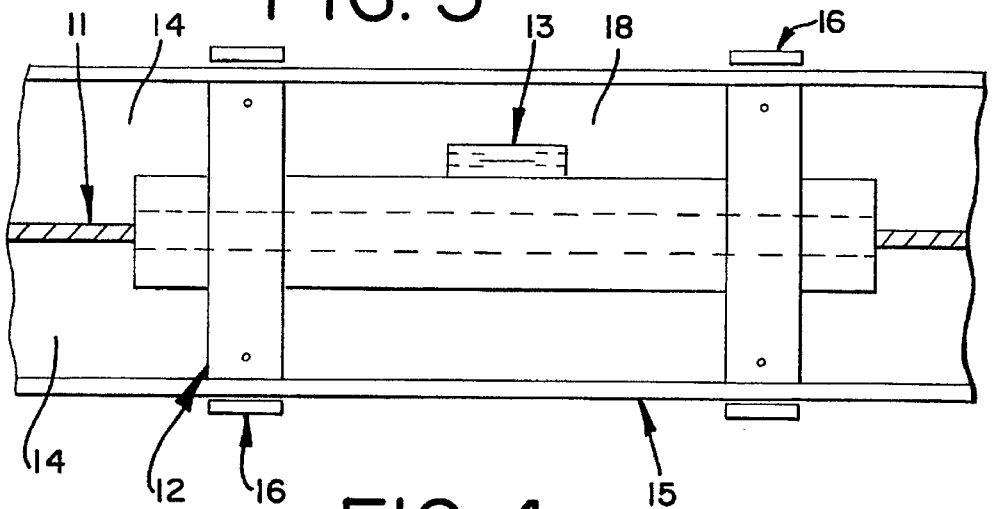
FIG. 3
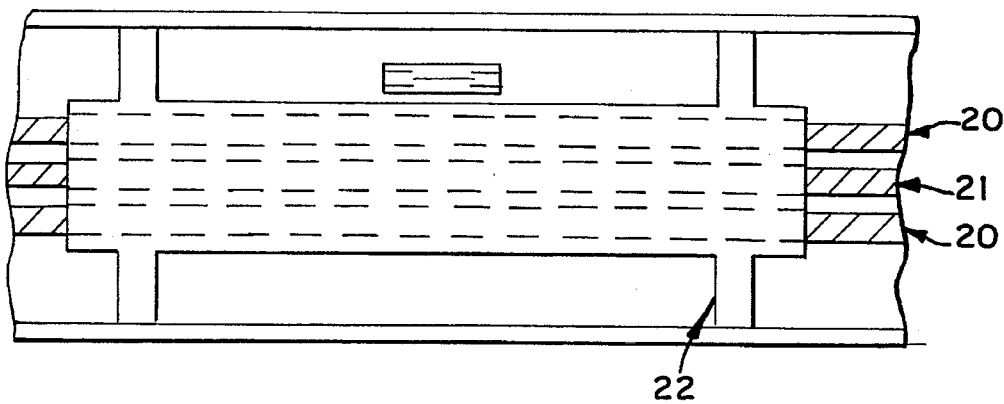
FIG. 4
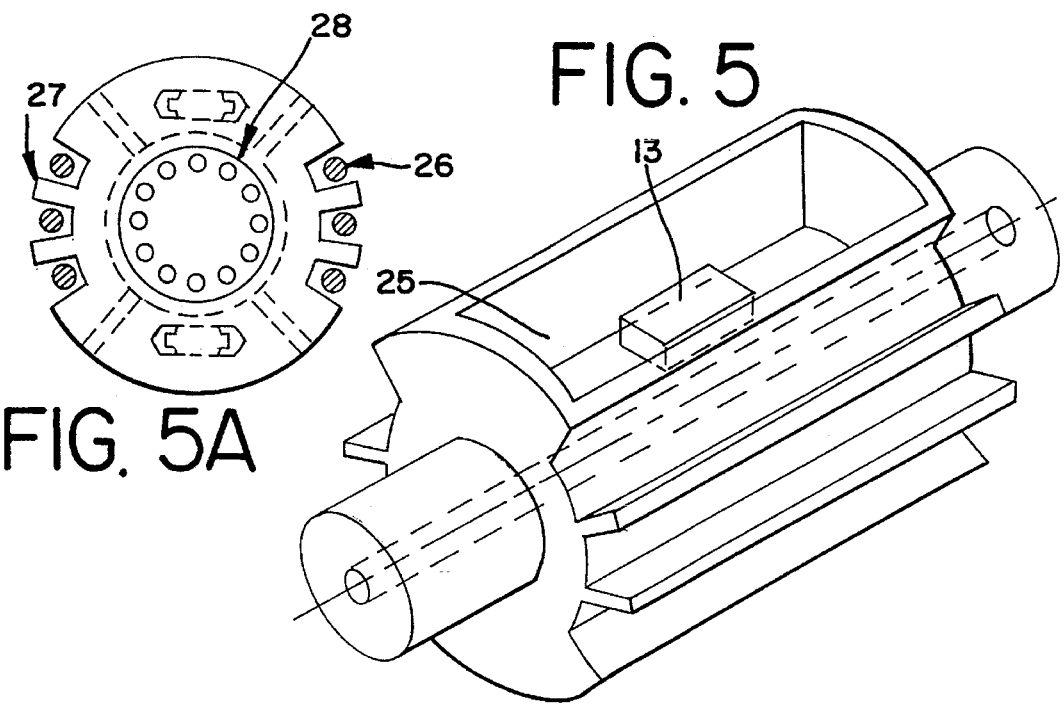
FIG. 5
FIG. 5A

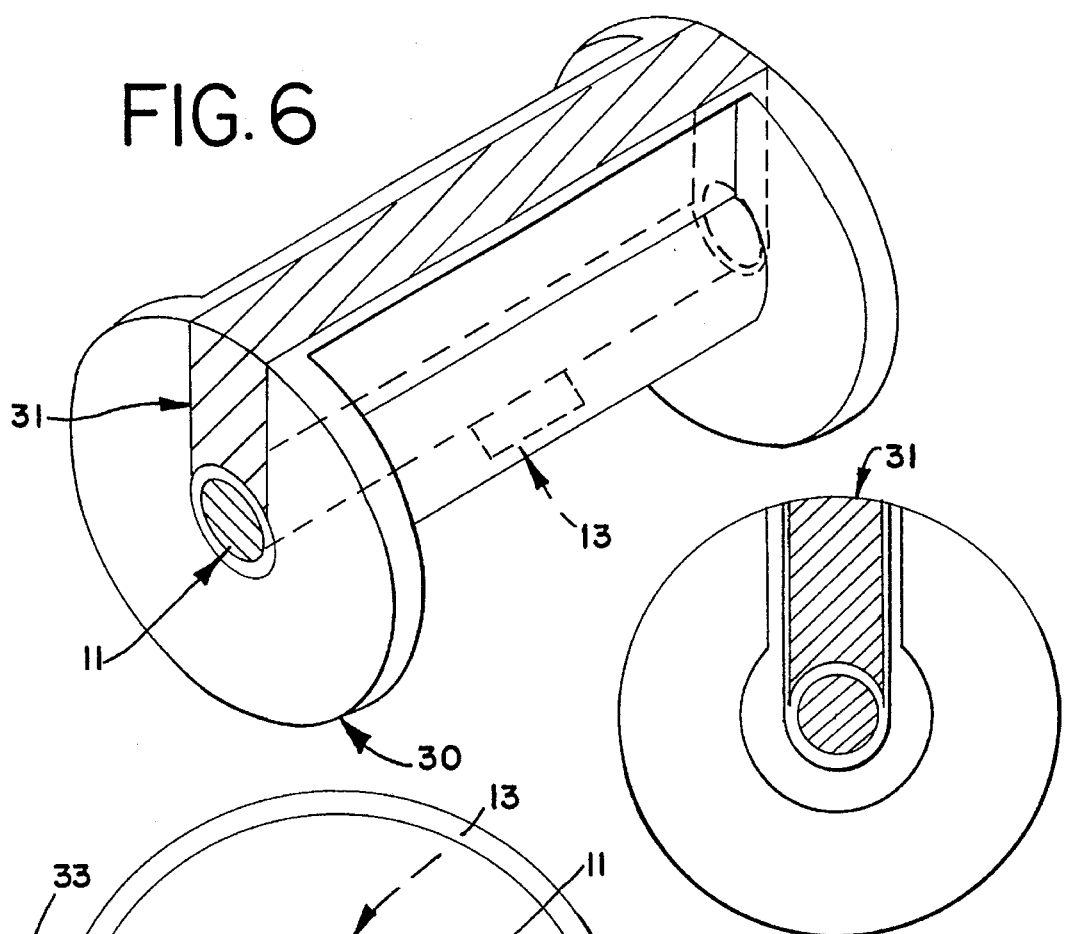
FIG. 6
FIG. 6A
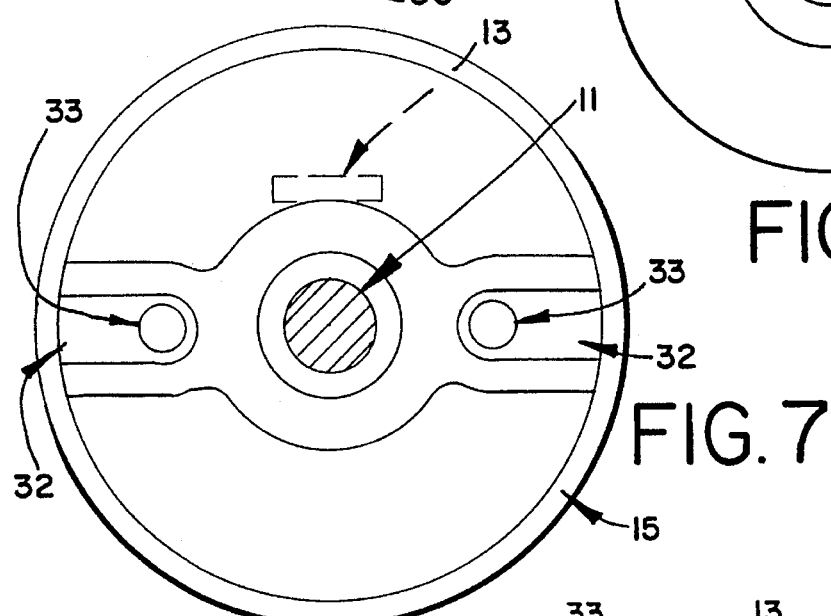
FIG. 7
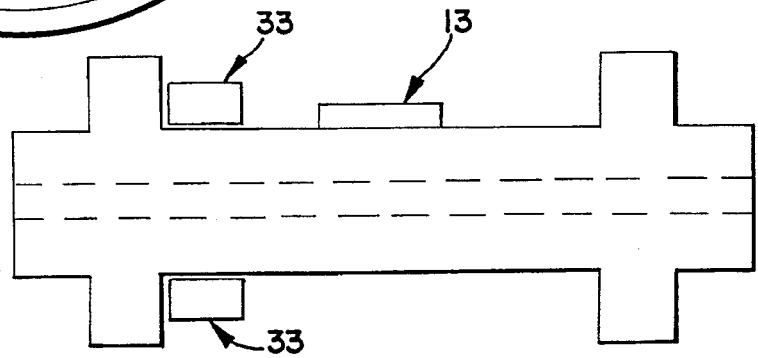
FIG. 8

HYDROPHONE CARRIER

This is a continuation of Ser. No. 08/192,418, filed Feb. 4, 1994, now abandoned.

TECHNICAL FIELD

The present invention pertains to the field of hydrophone arrays used for sonic imaging. Typically these arrays consist of a mechanical structure which locates a plurality of hydrophones with respect to each other. The mechanical structure also provides a convenient means of deploying, using and retrieving the array. Usually some electronic circuitry and other devices are incorporated in the array to facilitate the collection of multiple channels of data, as well as control the array. The common term for these arrays is "streamer" and this term will be used hereafter.

BACKGROUND OF THE INVENTION

In application, the streamers are usually towed behind a vessel, either a ship or submarine. In active sensing, an acoustic noise source insonifies an area and the streamer detects reflections from any targets in the area. In passive sensing the streamer merely "listens" for any noise generated by targets. This invention describes techniques that may be applied to streamers used in either application.

An axial section of a prior art streamer structure is given in FIG. 1 and will be familiar to those skilled in the art. Connector 1 mechanically, electrically and optically connects each streamer section to the one before it and thence ultimately to the towing vessel. The signal from hydrophone 2 (only one hydrophone is shown) is taken to connector 1 via wires 3. Strength members 4 run from connector to connector and provide the axial mechanical strength. A core material, either solid or liquid, fills the space 5 to provide buoyancy (and in some cases desirable acoustic properties). The streamer section is enclosed with a continuous skin 6, which protects the in-streamer components from water ingress.

A critical performance criterion of streamers is the self noise of the streamer. That is, the unwanted acoustic signal that is detected by the hydrophones when the streamer is towed through the water. The self noise has two major components, that caused by the turbulence generated by towing the streamer through the water (flow noise) and that induced by the vibration of the streamer structure. A large part of the vibration coupled into the streamer originates from the tow vessel and is transmitted to the hydrophone section via the towing cable and strength members. Other sources of vibration may also be present, but are usually less important.

In liquid filled streamers the vibration noise is dominated by a single propagating wave and can be reduced by designing a group of hydrophones which are spaced in the direction of propagation, the spacing being a function of the wavelength of the propagating wave. The signals from the group of hydrophones are then summed into a single channel and the wave effects thus cancel each other. Although this technique is successful at noise reduction over a limited frequency range at the design temperature, the performance cannot be sustained for the temperature range over which the seismic streamer has to operate due to changes in the characteristics of the propagating wave. Typically the jacket material has to be changed to sustain the performance.

Hitherto, liquid filled streamers have been used since the liquid fill has been shown to have favourable properties with regard to self noise, but liquid filled streamers are fragile and can be inconvenient in operation. For example, damage to one section of the streamer during steady state towing can lead to a "knock-on effect" whereby all the sections fail progressively as the streamer sinks. Damage to a section of solid-filled streamer will not necessarily lead to failure of that particular section or any other section and, accordingly, solid-filled streamers are generally preferred.

Liquid filled streamers are also susceptible to damage during recovery and deployment which is normally achieved by winching. In order to minimise this damage streamers are recovered at low boat speeds and winching speeds. The low recovery speeds and susceptibility to damage during winching can lead to loss of valuable survey time with a consequent loss of revenue. This becomes more evident when data is being collected using multiple streamers. The use of solid streamers allows recovery at the normal operating speeds with loss of data only from the streamer being recovered. The recovery time is also reduced by winching at line speeds higher than that which can be achieved with liquid filled streamers.

Efforts at replacing liquid filled with more robust solid filled streamers have been frustrated by difficulties in reducing the self noise of solid streamers to acceptable levels.

In conventional streamer structures such as that shown in FIG. 1, vibration at the head of the streamer couples via the strength members 4 and connector plates 1 into the core material 5 of the streamer which is liquid. This then generates a slow speed bulge or breathing wave of high amplitude, compared with the acoustic signals normally received by the hydrophones, thus increasing the overall self noise of the streamer. If the core material 5 is solid the performance is usually worse, unless the carrier disclosed herein is incorporated.

SUMMARY OF THE INVENTION

This invention is primarily concerned with the reduction of vibration induced noise at the hydrophones in a solid filled streamer structure although it is equally applicable to liquid filled streamers. The invention does not require a group of hydrophones to achieve acceptable vibration performance.

The robustness of the invention over a range of operating temperatures and handling conditions provides a design to meet a large range of operating conditions.

Furthermore the invention is not limited by the type of transducer and a range of piezo electric ceramic, piezo electric polymer and fibre optic transducers can be accommodated by the invention.

It is well known that certain transducer configurations produce a low output when vibrated in air. A typical type of transducer which is used in seismic streamers is a pair of piezo ceramic discs mounted back to back mechanically. These transducers are thus designed for low vibration sensitivity when vibrated in a plane at right angles to the plane of the disc and are intrinsically insensitive when vibrated in an axis parallel to the plane of the disc. However, this performance is not sustained when the hydrophone is mounted in streamers. The noise levels at the hydrophone in a streamer are increased due to stresses and strains generated in the solid filler (or pressure in the case of a liquid filler) surrounding the hydrophone. This invention addresses this shortfall by producing, for typical hydrophones, vibration sensitivities close to that of a plain transducer in air.

Various types of mounts have been used in the past to mount hydrophones in a seismic cable. For example, Cholet et al. U.S. Pat. No. 3,371,311 discloses a mount designed for fluid filled cables, the claimed function of which is to isolate the hydrophone from streamer vibrational movement, yet admitting transmission of pressure fluctuations from the streamer structure to the hydrophone cavity. As a matter of fact, it has been found in practice that the most inconvenient extraneous noise results from structural pressures or stresses induced by the presence of cable vibration, such extraneous noise therefore manifesting through the normal operation of the hydrophone as a pressure transducer. Mounts such as those disclosed by Cholet et al. do not isolate the hydrophone from the stress and strain which results from vibrations within a streamer, as they provide for communication between the streamer and the region in which the hydrophones are mounted. Therefore use of such mounts is of no utility in reducing a major component of self-noise.

According to the invention there is provided a hydrophone carrier adapted to mount a hydrophone in a streamer, said carrier consisting of a pair of end plates spaced apart axially by at least one rigid or semi-rigid central member, thus defining a zone between said end plates thus defining a zone between said end plates which is isolated from structural stress and strain induced by streamer borne vibration, yet admitting externally induced pressure fluctuations such as result from acoustic waves present in the external environment. The rigid or semi-rigid central member may be arranged in a variety of configurations to allow streamer strength members and wires to pass through said carrier. The streamer is typically encompassed by an outer skin which may be clamped or fixed to said end plates or may be included as an integral part of said carrier to further reduce vibration within said isolation zone.

In a practical realization of a typical solid cable, all spaces external to the carrier would be filled with solid material, usually of polymer composition, with sufficiently low density to provide an overall neutrally buoyant structure in water. The region within the carrier may be liquid, gel or solid filled.

To aid in mechanical location of the carrier, the central member of the carrier may be bonded with a relatively compliant material, to the streamer's strength members. In this case, care must be taken to ensure that the central member of the carrier is sufficiently rigid axially and radially to provide the desired isolation from stress and strain within the solid buoyancy material.

BRIEF DESCRIPTION OF THE DRAWINGS

Preferred embodiments of the invention will now be described, by way of example only, with reference to the accompanying drawings in which:

FIG. 3 is the hydrophone carrier of FIG. 2 shown in situ;

FIG. 4 is a second embodiment of hydrophone carrier according to the invention shown in situ;

FIG. 5 and 5A is a third embodiment of a hydrophone carrier according to the invention shown in situ in a perspective view;

FIG. 6 and 6A is a fourth embodiment of a hydrophone carrier according to the invention shown in situ in a perspective view;

FIG. 7 is a fifth embodiment of a hydrophone carrier according to the invention shown in situ in cross section.

DESCRIPTION OF PREFERRED EMBODIMENTS

Figure 1:
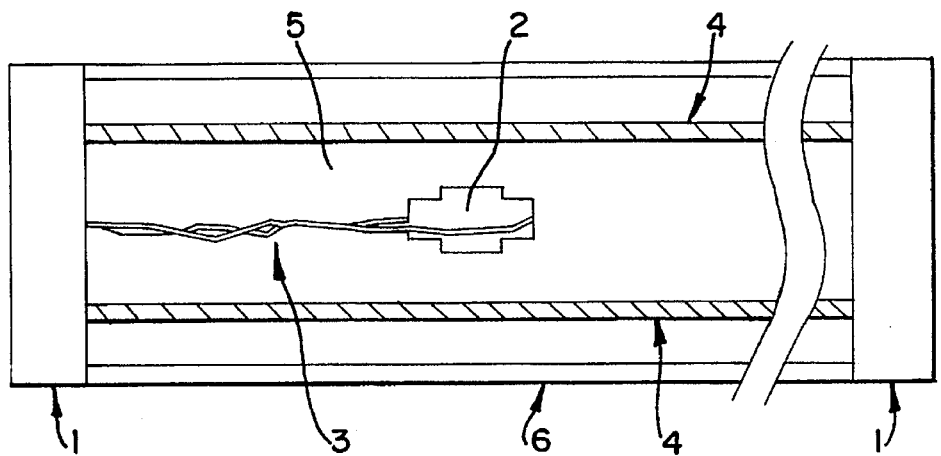
FIG. 1 is a prior art streamer structure shown in axial section.
Figure 2:
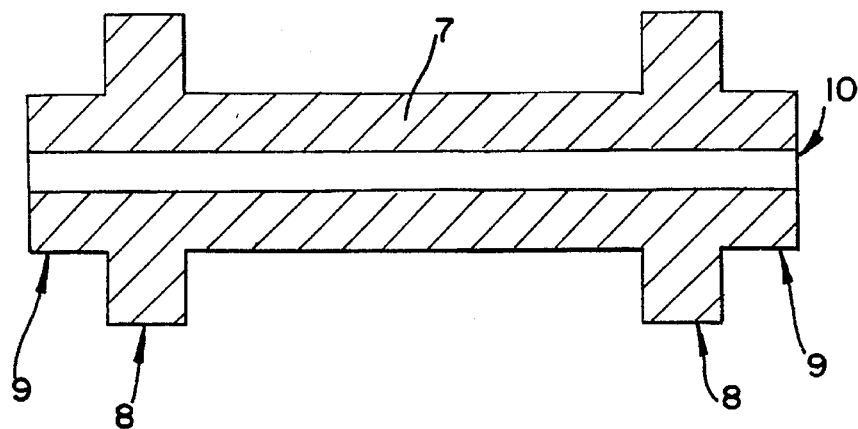
FIG. 2 is a hydrophone carrier according to the invention shown in axial section.
Figure 2A:
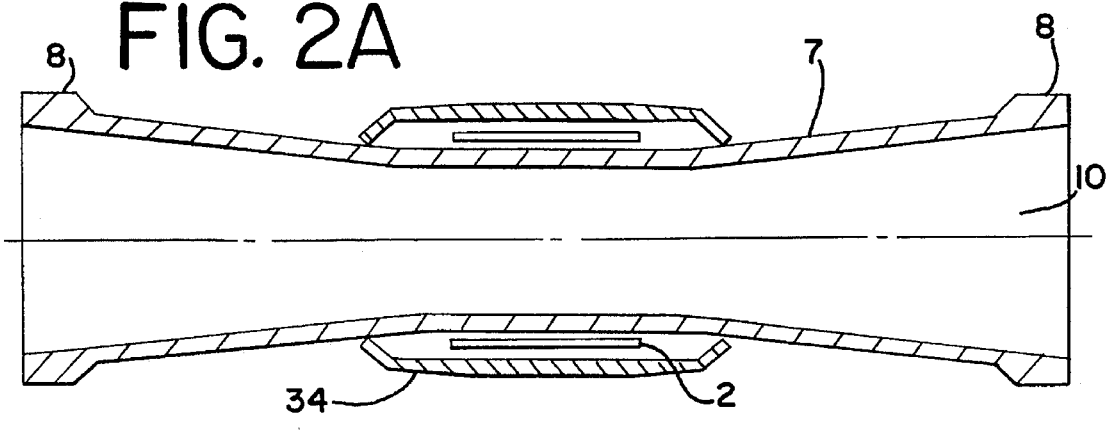
FIG. 2a is another representation of a hydrophone carrier according to the invention in axial section.

The essence of the invention are the means by which stresses and strains caused by streamer structure borne vibration is isolated from the hydrophone by means of a hydrophone carrier. FIG. 2 shows an axial cross section through an embodiment of the hydrophone carrier. The carrier consists of a spindle 7, end plates 8 and bosses 9. The carrier is bored through with a hole 10. The bosses 9 help to locate the carrier within the core, but have little effect on the isolation performance. The bosses 9 have not been shown on all of the remainder of the figures for clarity. An alternative realization of the carrier would have the hole 10 flared at the ends to locate the carrier within the core as shown in FIG. 2a with features identified as in FIG. 2.

FIG. 3, showing a simplified streamer, sectioned axially, exemplifies how the carrier is integrated into a practical streamer. The streamer consists of a central strength member 11 which passes through the length of the streamer. The strength member 11 passes through the hydrophone carrier 12 in which the hydrophone 13 is mounted. The remainder of the streamer is made up of core 14 and skin 15. Not shown are wires for telemetry, control etc. The strength member 11 is attached to the solid core 14 which in turn is firmly attached to the skin 15. It is advantageous for optimum performance that the strength member 11 not be mechanically coupled to the core for a few centimeters either side of the carrier.

In the structure shown in FIG. 3, the hydrophone is isolated from structural stress and strain by the carrier. The strength member 11 is not tightly coupled into the carrier and the hydrophone 13 is isolated from the rest of the streamer by the end plates 8 which are held apart rigidly by the spindle 7. Since the carrier material is considerably more rigid than the buoyant core material, the only way for vibration induced stress and strain to couple into the hydrophone is by the skin 15. This, however, is negligible and can be reduced further by placing band clamps 16 around the streamer, however this has not yet been shown to be necessary to obtain good vibration performance. Where the material surrounding the hydrophone is fluid, clamps may be necessary to prevent fluid leakage.

The method of preventing the hydrophone mounting from being strained has other benefits which became apparent while testing the invention. The vibration induced stress and strain sensitivity of the hydrophone within the carrier is rendered insensitive to temperature variation. This arises because the material (either solid or gel or liquid) 18 surrounding the sensor is also isolated and hence the material properties cannot significantly influence the vibration induced self noise levels. Not shown has been the method of mounting the hydrophone on the carrier. It has been found to be advantageous to suspend the hydrophone compliantly rather than bond it rigidly to the carrier. A method for doing this is to glue soft rubber blocks to the carrier and attach a non-sensing part of the hydrophone to those blocks. For the bender type of hydrophone, the non-sensing part is the frame the sensing plates are attached to.

The flexibility of the invention is such that by spacing the sensors using flexible polymers a situation is created where the streamer can be winched at the normal towing load for seismic operations. The delicate sensors are protected from damage during winching by the spindle 7 and end plates 8. Further protection may be provided by running bars between the peripheries of the end plates, parallel to the carrier spindle or by other means such as a hard "basket 34" over the sensor 2 as depicted in FIG. 2a.

In the interests of simplicity, the principle of the invention has been illustrated using a central strength member and omitting the necessary devices and objects for telemetry and control. It is however possible to use a plurality of strength members as shown in FIG. 4. Here, two strength members 20 and a wire bundle 21 are shown passing through a suitably drilled carrier 22. The principle of isolating the hydrophone from the structure still holds.

The principle of isolation can be extended to strength members being on the outside of the carrier. FIG. 5 shows a cross section of the streamer in the middle of the carrier. The isolated part of the streamer is the approximately trapezoidal volume 25. The strength members 26 pass through the carrier on the side. Locating ribs 27 serve to hold the strength members in place. Devices and objects for telemetry and control 28 may be placed on the streamer axis. With any of the embodiments of FIGS. 2a, 3, 4, and 6, it is possible to form a single central core by packaging the wires with the strength members so that only one axial hole is required in the carrier.

Another method of realising the invention is to make the carrier in the shape of a "horseshoe". As shown in FIG. 6 and 6A, this can then be readily slipped over the central strain member 11. A block 31 may then be glued or otherwise fastened to the carrier 30 to prevent the strength member from coming out of the carrier.

FIG. 7 shows a way of managing the wires and devices for telemetry which may be adapted for use with any of the embodiments described. FIG. 7 shows it specifically adapted for use with the embodiment of FIG. 3 by means of an axial cross section through the part of the carrier which contains the hydrophone 13. The strength member 11 passes through the centre as before and the wires and devices for telemetry 33 pass through the axial slots 32. Movement in the wires and devices for telemetry 33 may be accommodated in the slots 32 without affecting vibration performance. This variation is advantageous in terms of incoporating these essential devices in practical streamers. Also shown for illustrative purposes is the streamer's outer skin 15.

The use of different strength member and carrier configurations provide the opportunity to design, manufacture and repair the streamer by a number of methods.

Although the invention has been described with reference to specific examples, it will be appreciated by those skilled in the art that the invention may be embodied in many other forms.

We claim:

1. A hydrophone carrier adapted to mount a hydrophone in a streamer, said carrier comprising an integral closed structure of an outer skin and a pair of rigid end plates spaced apart axially by at least one central member, said skin and end plates defining an enclosed zone between said end plates, said carrier isolating said zone from structural stress and strain, such as induced by cable borne vibration, and admitting externally induced pressure fluctuations.

2. A hydrophone carrier according to claim 1, wherein said streamer includes at least one strength member running longitudinally therethrough and said carrier is provided with means allowing said at least one strength member to pass therethrough while being mechanically isolated from said at least one strength member.

3. A hydrophone carrier according to claim 2, wherein said means comprises a central axial hole formed in said carrier and, in use, spaced from said strength member.

4. A hydrophone carrier according to claim 2, wherein said means comprises at least one slot formed in the outer periphery of said end plates, said at least one slot, in use, being spaced from said strength member or members.

5. A hydrophone carrier according to claim 3, wherein said carrier further includes at least one slot formed in the outer periphery thereof for accommodating connecting means mounted in said streamer.

6. A hydrophone carrier according to claim 1, wherein said hydrophone is mounted to said carrier by compliant mounting means.

7. A hydrophone carrier according to claim 1, wherein said end plates and said at least one central member are formed integrally.

8. A hydrophone carrier according to claim 1, wherein the carrier is formed in two parts, the first part being generally C-shaped in cross-section for, in use, fitting over said strength member or members and a second part being complementary to said first part and fitting into said first part to prevent removal of said at least one strength member or members from the carrier.

9. A seismic streamer incorporating the carrier of claim 1, wherein said streamer is encompassed by an outer skin and the carrier is fixed to said outer skin of the streamer.

10. A seismic streamer according to claim 9, wherein the carrier is fixed by clamping means positioned circumferentially around the streamer outer skin adjacent said end plates.

11. A seismic streamer incorporating the carrier of claim 2, wherein said carrier is mounted to said at least one strength member by compliant mounting means.

* * * * *